(12) United States Patent
Roos

(10) Patent No.: US 7,370,450 B2
(45) Date of Patent: May 13, 2008

(54) FISHING HOOK

(76) Inventor: Petrus Jacobus Roos, 32 Harold Grenfell, Messina, 0900, Limpopo (ZA)

( * ) Notice: Subject to any disclaimer, the term of this patent is extended or adjusted under 35 U.S.C. 154(b) by 0 days.

(21) Appl. No.: 11/516,127

(22) Filed: Sep. 6, 2006

(65) Prior Publication Data
US 2007/0062096 A1 Mar. 22, 2007

(30) Foreign Application Priority Data
Sep. 14, 2005 (ZA) .............................. 2005/07402

(51) Int. Cl.
*A01K 83/02* (2006.01)
*A01K 85/02* (2006.01)
(52) U.S. Cl. .............................. 43/36; 43/35; 43/42.41
(58) Field of Classification Search ............. 43/34–37, 43/42.24, 42.41, 44.2
See application file for complete search history.

(56) References Cited

U.S. PATENT DOCUMENTS

| 95,755 | A | * | 10/1869 | Angers ........................... 43/36 |
|---|---|---|---|---|
| 330,793 | A | * | 11/1885 | Lie ................................ 43/35 |
| 534,694 | A | * | 2/1895 | Kienle ........................... 43/36 |
| 570,344 | A | * | 10/1896 | Smith ............................ 43/36 |
| 783,253 | A | * | 2/1905 | Flegel ........................... 43/36 |
| 985,659 | A | * | 2/1911 | Clayton ......................... 43/35 |
| 1,172,780 | A | * | 2/1916 | Ferree ........................... 43/36 |
| 1,354,952 | A | * | 10/1920 | Bullock ......................... 43/35 |
| 1,448,735 | A | * | 3/1923 | Edmondson ................... 43/36 |
| 1,464,215 | A | * | 8/1923 | Olson ............................ 43/35 |
| 1,609,151 | A | * | 11/1926 | Bruenig ......................... 43/35 |
| 1,609,160 | A | * | 11/1926 | Deckman ....................... 43/36 |
| 1,609,519 | A | * | 12/1926 | Lawson ......................... 43/36 |
| 1,623,870 | A | * | 4/1927 | Goodgame ..................... 43/36 |
| 1,649,140 | A | * | 11/1927 | Steffens ......................... 43/36 |
| 1,672,498 | A | * | 6/1928 | Otto .............................. 43/35 |
| 2,211,064 | A | * | 8/1940 | Krumdick ..................... 43/44.2 |
| 2,225,965 | A | * | 12/1940 | Ball .............................. 43/36 |
| 2,242,592 | A | * | 5/1941 | Noxon .......................... 43/35 |
| 2,295,042 | A | * | 9/1942 | Llewellyn ..................... 43/35 |
| 2,325,247 | A | * | 7/1943 | Helfenstein ................... 43/36 |
| 2,357,357 | A | * | 9/1944 | Premo .......................... 43/36 |
| 2,403,202 | A | * | 7/1946 | Woodward ..................... 43/35 |
| 2,445,601 | A | * | 7/1948 | Carlsen et al. ................. 43/36 |
| 2,544,782 | A | * | 3/1951 | Fawcett ......................... 43/36 |
| 2,611,986 | A | * | 9/1952 | Silva .......................... 43/42.28 |
| 2,955,377 | A | * | 10/1960 | Appel ........................... 43/35 |

(Continued)

FOREIGN PATENT DOCUMENTS

FR 2814336 A1 * 3/2002

(Continued)

*Primary Examiner*—Darren W Ark
(74) *Attorney, Agent, or Firm*—Ladas & Parry LLP

(57) ABSTRACT

A fishing hook is disclosed comprising an elongate body defining a front end and a rear end to which a fishing line can be secured and at least one elongate arm terminating in a barb. The at least one elongate arm is fitted to the elongate body so as to be movable between a closed position in which it is aligned with the elongate body and a fully open position in which the at least one elongate arm extends transversely relative to the elongate body. In an example embodiment, the hook includes a pair of elongate arms, each arm terminating in a barb, with the pair of arms being pivotally fitted to the elongate body.

5 Claims, 1 Drawing Sheet

U.S. PATENT DOCUMENTS

| | | | | |
|---|---|---|---|---|
| 3,026,645 A | * | 3/1962 | Burnett | 43/37 |
| 3,059,371 A | * | 10/1962 | Haynie, Sr. | 43/35 |
| 3,081,572 A | * | 3/1963 | Tomsello | 43/35 |
| 3,100,359 A | * | 8/1963 | Laba | 43/35 |
| 3,802,114 A | * | 4/1974 | Diebold | 43/37 |
| 3,890,735 A | * | 6/1975 | Serrill | 43/36 |
| 3,905,149 A | * | 9/1975 | McCloud | 43/44.2 |
| 4,163,336 A | * | 8/1979 | Carpenter | 43/37 |
| 4,638,591 A | * | 1/1987 | Neumann et al. | 43/34 |
| 4,873,781 A | * | 10/1989 | Bates | 43/35 |
| 5,195,268 A | * | 3/1993 | Ellis et al. | 43/37 |
| 5,233,784 A | * | 8/1993 | Ellis et al. | 43/37 |
| 5,491,925 A | * | 2/1996 | Carpenter | 43/37 |
| 5,564,216 A | * | 10/1996 | McMillan | 43/37 |
| 5,577,340 A | * | 11/1996 | Murphy | 43/35 |
| 5,611,166 A | * | 3/1997 | Day | 43/35 |
| 5,946,846 A | * | 9/1999 | Cotton | 43/36 |
| 2007/0101634 A1 | * | 5/2007 | Clapp | 43/35 |
| 2007/0180756 A1 | * | 8/2007 | McHone | 43/35 |

FOREIGN PATENT DOCUMENTS

| | | | |
|---|---|---|---|
| JP | 4-169142 A | * | 6/1992 |
| JP | 10-295220 A | * | 11/1998 |
| JP | 10-323143 A | * | 12/1998 |
| JP | 11-113447 A | * | 4/1999 |
| JP | 2002-128 A | * | 1/2002 |
| JP | 2003-18946 A | * | 1/2003 |

* cited by examiner

FISHING HOOK

BACKGROUND OF THE INVENTION

THIS invention relates to a fishing hook, and in particular to a bass fishing hook.

Conventional bass fishing hooks comprise a curved hook to which a fishing line can be secured. These hooks are typically, when being used, fitted to a plastic worm that acts as bait for the fish. However, when fitted to the worm, the curved portion of the hook tends to be exposed, which reduces the effectiveness of the worm as bait.

The aim of the present invention is thus to provide an improved bass fishing hook, which addresses the shortcoming described above.

SUMMARY OF THE INVENTION

According to a first aspect of the invention, there is provided a fishing hook comprising:
  an elongate body defining a front end and a rear end to which a fishing line can be secured; and
  at least one elongate arm terminating in a barb, the at least one elongate arm being fitted to the elongate body so as to be movable between a closed position in which it is aligned with the elongate body and a fully open position in which the at least one elongate arm extends transversely relative to the elongate body.

In an example embodiment, the hook includes a pair of elongate arms, each arm terminating in a barb.

Conveniently, the at least one elongate arm is pivotally fitted to the elongate body.

In an example embodiment, the elongate body comprises:
  a shaft terminating in a tapered tip that defines the front end of the elongate body; and
  a connector fitted to the shaft, the connector terminating in a securing ring for receiving the fishing line.

Conveniently, the elongate body defines at least one recess for accommodating the at least one elongate arm when the arm is in its closed position.

According to a second aspect of the invention, there is provided a fishing hook kit comprising:
  a worm including a body portion; and
  a fishing hook comprising
    an elongate body defining a front end and a rear end, to which a fishing line can be secured; and
    at least one elongate arm terminating in a barb, the at least one elongate arm being fitted to the elongate body so as to be movable between a closed position in which it is aligned with the body for facilitating insertion of the hook into the body portion of the worm, an intermediate open position in which the barb engages the body portion of the worm so as to fix the hook relative to the worm, and a fully open position in which the arm protrudes from the body portion of the worm.

In an example embodiment, the body portion of the worm defines an elongate groove along its length.

DESCRIPTION OF THE PREFERRED EMBODIMENT

Figure 1:
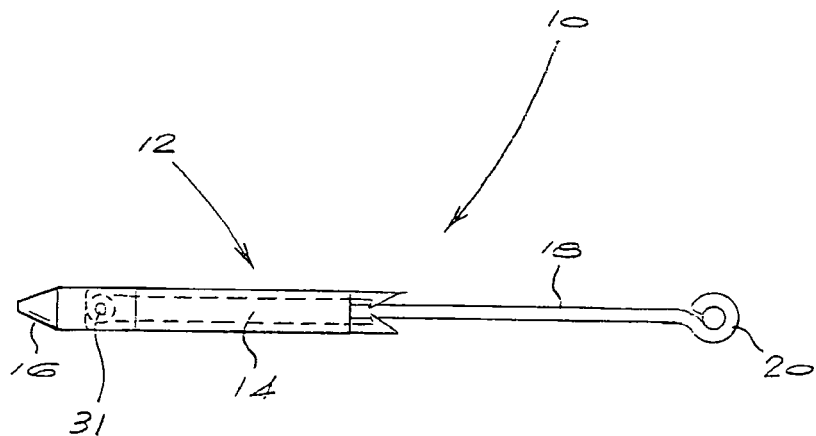
FIG. 1 shows a top plan view of a bass fishing hook according to the present invention, the hook comprising an elongate body and a pair of arms, with the arms in this figure being shown in a closed configuration in which they are aligned with the elongate body of the hook.

Referring to the figures, a bass fishing hook 10 includes an elongate body 12 comprising a shaft 14 terminating in a tapered tip 16 that defines a front end of the elongate body 12. The elongate body 12 further comprises a connector 18 fitted to the shaft 14, the connector terminating in a securing ring 20 to which a fishing line 22 can be fixed.

In an example embodiment, the shaft 14 includes a pair of elongate slots or recesses 24, 26 for receiving a pair of elongate arms 28, 30, respectively. The arms 28, 30 are pivotally fitted to the front end of the elongate body 12 at pivot point 31, with the pivot point 31, in an example embodiment, taking the form of a pivot pin extending through the front end of the elongate body 12.

Alternatively, the shaft 14 may only be fitted with one pivotable elongate arm 28, 30.

In example embodiments, an elongate body 12 having a 6 mm diameter may accommodate two arms 28, 30, and an elongate body 12 having a 5 mm diameter may accommodate only one arm 28, 30.

Figure 2:
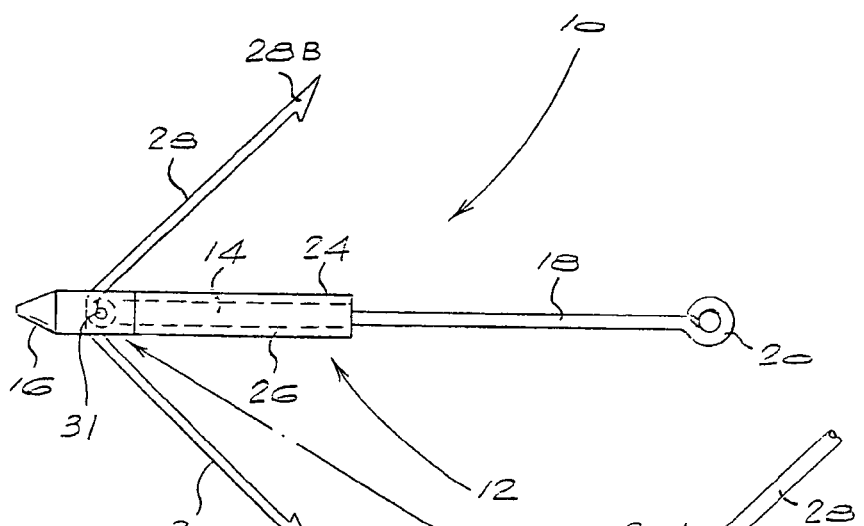
FIG. 2 shows a top plan view of the bass fishing hook, but with the arms being shown in an open, splayed configuration.

Each arm 28, 30 has a flat base portion 28A, 30A, respectively, which in the open, flared position shown in FIG. 2, abuts against a wall 32 inside the front end of the elongate body 12. This arrangement ensures that the arms 28, 30 can only open to a certain extent, as shown in FIG. 2. Each flat base portion 28A, 30A terminates in a loop for receiving the pivot pin 31.

Each arm 28, 30 terminates in a barb 28B, 30B, respectively, with the barbs 28B, 30B, in an example embodiment, being arranged to overhang the shaft 14, as shown in FIG. 1.

Significantly, the arms 28, 30 are movable between a closed position, as shown in FIG. 1, in which the arms 28, 30 are aligned with the body 12, and an open, splayed position, as shown in FIG. 2.

In an example embodiment, a plastic worm 34 may also be provided, the worm 34 comprising a body portion 36 and a tail portion 38. In an example embodiment, the body portion 36 is a solid body. However, the body portion 36 may also define a hollow chamber. To facilitate insertion of the hook 10 into the worm 34, the worm 34 may define a slot or groove 40, approximately 5 cm in length and 2 mm in depth.

Figure 3:
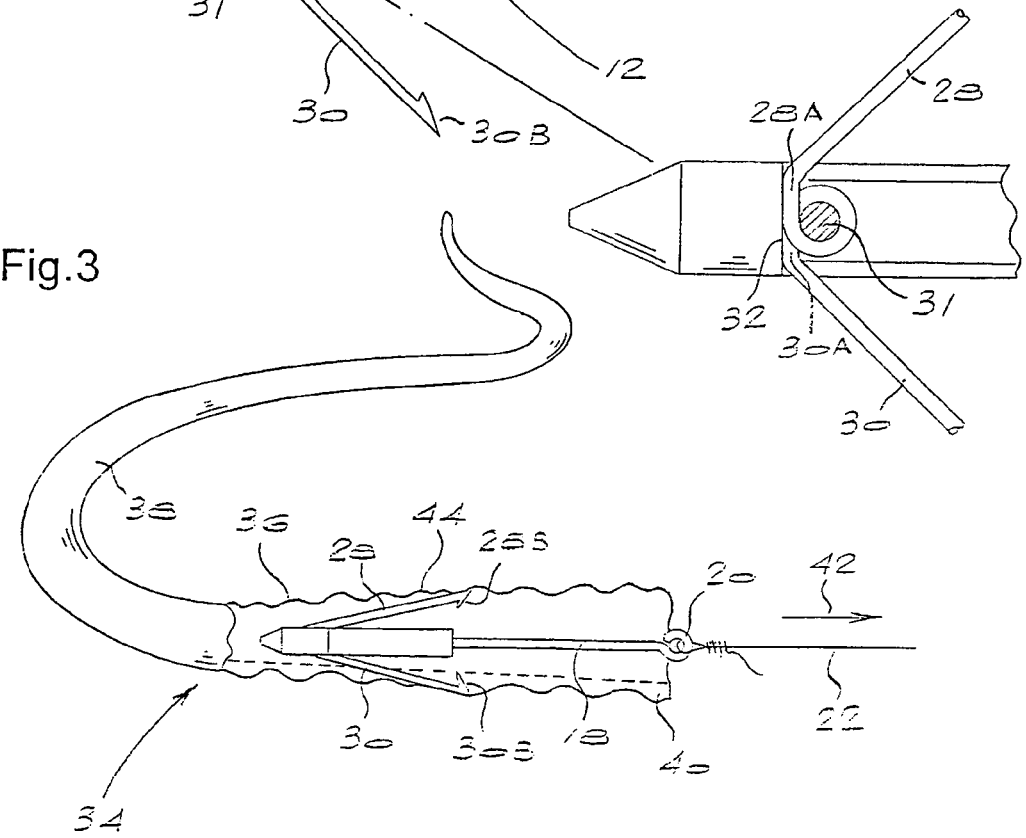
FIG. 3 shows a top plan view of the bass fishing hook of the present invention fitted within a plastic worm, ready for use.

Thus, in use, and with particular reference now to FIG. 3, the arms 28, 30 are first moved into the closed position, for facilitating insertion of the hook 10, and in particular the elongate body 12 into the plastic worm 34. Once inside the worm 34, the connector 18 and/or line 22 is pulled a small distance in the direction shown by arrow 42, so that the barbs 28B, 30B of the arms 28, 30 engage the body portion 36 of the worm 34 so as to fix the hook 10 relative to the worm 34. The hook 10 is now ready to be used, as shown in FIG. 3, with the arms 28, 30 taking an intermediate open position.

When a fish bites on the hook 10, the person handling the hook 10 may tug on the line 22 in the direction of arrow 42, thereby causing the connector 18 and shaft 14 of the hook 10 to also move in the direction of arrow 42. This will cause the arms 28, 30 to protrude from the worm body portion 36. This in turn will cause the barbs 28B, 30B to engage the biting fish and for the arms 28, 30 to simultaneously move into a fully open position (shown in FIG. 2) relative to the elongate body 12.

To remove the hook 10 from the worm 34 after the fish has been removed from the hook 10, it is a simple matter of pushing the hook 10 into the worm body portion 36 so as to collapse the arms 28, 30.

The present invention thus provides a simple, reusable and discrete fishing hook, which, although primarily aimed to catch bass, can also be used to catch other fish, such as marlin.

I claim:

1. A fishing hook comprising:

an elongate body defining a front end and a rear end to which a fishing line can be secured, the elongate body comprising a shaft terminating in a tapered tip that defines the front end of the elongate body and a connector fitted to the shaft, the connector terminating in a securing ring for receiving the fishing line that defines the rear end of the elongate body, and the elongate body defining both a fixed pivot point at a pivot pin proximate the front end and at least one elongate recess, the at least one recess extending parallel to a longitudinal axis of the elongate body; and at least one elongate arm terminating in a barb, the at least one elongate arm being fitted to the elongate body at the pivot point so as to be pivotally movable between a closed position, in which the at least one elongate arm is aligned with the elongate body and accommodated within the at least one elongate recess at the body, and a fully open position in which the at least one elongate arm extends transversely relative to the elongate body, the at least one elongate arm comprising a flat base portion, which, in the open position, abuts against a wall inside the front end of the elongate body that extends transverse to the longitudinal axis of the elongate body so as to limit the extent to which each arm can open, the flat base portion of the at least one elongate arm terminating in a loop for receiving the pivot pin that defines the fixed pivot point, the pivot pin extending through the front end of the elongate body, the at least one recess extending between the wall inside the front end of the elongate body and the securing ring, the at least one elongate arm positioned between the tapered tip and securing ring along the longitudinal axis of the elongate body, and wherein the wall inside the front end of the elongate body is positioned between the pivot pin and tapered tip along the longitudinal axis of the elongate body;

wherein the fishing hook is configured to be inserted into a bait, with the at least one elongate arm being arranged to protrude through the bait by pulling on the elongate body.

2. A fishing hook according to claim 1, wherein the hook includes a pair of elongate arms arranged to pivot around the fixed pivot point, each arm terminating in a barb.

3. A fishing hook according to claim 1, wherein the elongate body comprises: a shaft terminating in a tapered tip that defines the front end of the elongate body; and a connector fitted to the shaft, the connector terminating in a securing ring for receiving the fishing line.

4. A fishing hook kit comprising:

a bait including a body portion; and a fishing hook comprising:

an elongate body defining a front end and a rear end to which a fishing line can be secured, the elongate body comprising a shaft terminating in a tapered tip that defines the front end of the elongate body and a connector fitted to the shaft, the connector terminating in a securing ring for receiving the fishing line that defines the rear end of the elongate body, and the elongate body defining both a fixed pivot point at a pivot pin and at least one elongate recess, the at least one recess extending parallel to a longitudinal axis of the elongate body; and at least one elongate arm terminating in a barb, the at least one elongate arm being fitted to the elongate body at the pivot point so as to be pivotally movable between a closed position in which the at least one elongate arm is aligned with the elongate body for facilitating insertion of the hook into the body portion of the bait, an intermediate open position in which the barb engages the body portion of the bait so as to fix the hook relative to the bait, and a fully open position in which the arm protrudes from the body portion of the bait so as to extend transversely relative to the elongate body, the at least one elongate arm comprising a flat base portion, which, in the open position, abuts against a wall inside the front end of the elongate body that extends transverse to the longitudinal axis of the elongate body so as to limit the extent to which each arm can open, the flat base portion of the at least one elongate arm terminating in a loop for receiving the pivot pin that defines the fixed pivot point, the pivot pin extending through the front end of the elongate body, the at least one recess extending between the wall inside the front end of the elongate body and the securing ring, the at least one elongate arm positioned between the tapered tip and securing ring along the longitudinal axis of the elongate body, and wherein the wall inside the front end of the elongate body is positioned between the pivot pin and tapered tip along the longitudinal axis of the elongate body.

5. A fishing hook kit according to claim 4, wherein the body portion of the bait defines an elongate groove along its length to facilitate insertion of the hook into the bait.

* * * * *